US012186959B2

(12) United States Patent
Kobayashi

(10) Patent No.: US 12,186,959 B2
(45) Date of Patent: Jan. 7, 2025

(54) MATERIAL DELIVERY DEVICE, THREE-DIMENSIONAL SHAPING DEVICE, AND INJECTION MOLDING DEVICE

(71) Applicant: SEIKO EPSON CORPORATION, Tokyo (JP)

(72) Inventor: Hiroki Kobayashi, Hara-Mura (JP)

(73) Assignee: Seiko Epson Corporation, Tokyo (JP)

(*) Notice: Subject to any disclaimer, the term of this patent is extended or adjusted under 35 U.S.C. 154(b) by 175 days.

(21) Appl. No.: 17/808,328

(22) Filed: Jun. 23, 2022

(65) Prior Publication Data

US 2022/0410456 A1 Dec. 29, 2022

(30) Foreign Application Priority Data

Jun. 24, 2021 (JP) .................................. 2021-104749

(51) Int. Cl.
*B29C 45/77* (2006.01)
*B29C 45/47* (2006.01)
(Continued)

(52) U.S. Cl.
CPC .............. *B29C 45/77* (2013.01); *B29C 45/47* (2013.01); *B29C 45/74* (2013.01); *B29C 64/209* (2017.08);
(Continued)

(58) Field of Classification Search
None
See application file for complete search history.

(56) References Cited

U.S. PATENT DOCUMENTS 4,678,420 A * 7/1987 Inoue ...................... B29C 45/76
425/149
6,325,612 B1 * 12/2001 Nakamura ............ B29C 45/585
425/207

(Continued)

FOREIGN PATENT DOCUMENTS

EP 2103409 A1 * 9/2009 ............. B29C 45/54
JP H06-198689 A 7/1994
(Continued)

OTHER PUBLICATIONS

Suzuki K. "English Machine Translation: JP-2000167896-A: Injection Molding Machine." 2024. Espacenet. EPO. (Year: 2024).*

(Continued)

*Primary Examiner* — Larry W Thrower
*Assistant Examiner* — Jonathan B Woo
(74) *Attorney, Agent, or Firm* — WORKMAN NYDEGGER

(57) ABSTRACT

A material delivery device includes: a plasticization unit having a screw and configured to plasticize a material by rotation of the screw to produce a plasticized material; a flow path through which the plasticized material flows; a nozzle having a nozzle opening that communicates with the flow path and delivers the plasticized material to an outside; a cylinder coupled to the flow path; a rod inserted into the cylinder; and a first pressure detection unit configured to detect a pressure of the plasticized material in the flow path via the rod. In a longitudinal direction of the rod, the rod has a rod end surface facing the flow path and a transmission unit at an opposite side of the rod end surface, and transmits a force due to the pressure received at the rod end surface to the first pressure detection unit via the transmission unit.

16 Claims, 9 Drawing Sheets

(51) Int. Cl.
    *B29C 45/74*     (2006.01)
    *B29C 64/209*     (2017.01)
    *B29C 64/295*     (2017.01)
    *B29C 64/393*     (2017.01)
    *B33Y 30/00*     (2015.01)
    *B33Y 50/02*     (2015.01)

(52) U.S. Cl.
    CPC .......... *B29C 64/295* (2017.08); *B29C 64/393* (2017.08); *B33Y 30/00* (2014.12); *B33Y 50/02* (2014.12); *B29C 2945/76006* (2013.01); *B29C 2945/7618* (2013.01); *B29C 2945/76545* (2013.01)

(56) References Cited

U.S. PATENT DOCUMENTS

| | | | |
|---|---|---|---|
| 2005/0109229 A1 | 5/2005 | Hasegawa | |
| 2018/0085981 A1* | 3/2018 | Namiki | B29C 45/76 |
| 2018/0133943 A1* | 5/2018 | Aiba | B29C 45/7306 |
| 2019/0061243 A1* | 2/2019 | Saito | B29C 64/35 |
| 2019/0232566 A1* | 8/2019 | Bosveld | B33Y 10/00 |
| 2020/0094480 A1* | 3/2020 | Yamasaki | B22F 12/53 |
| 2020/0376768 A1* | 12/2020 | Bruggeman | B29C 64/106 |
| 2021/0197434 A1* | 7/2021 | Anegawa | B29C 45/54 |
| 2021/0197473 A1 | 7/2021 | Koehler et al. | |
| 2021/0299959 A1 | 9/2021 | Tsunoya | |
| 2022/0016818 A1* | 1/2022 | Kubo | B29C 45/54 |
| 2022/0024097 A1* | 1/2022 | Maruyama | B29C 64/209 |
| 2022/0266491 A1* | 8/2022 | Hosotsubo | B29C 45/768 |

FOREIGN PATENT DOCUMENTS

| | | | | |
|---|---|---|---|---|
| JP | H11156902 A | * | 6/1999 | ............. B29C 45/77 |
| JP | 2000167896 A | * | 6/2000 | ............. B29C 45/54 |
| JP | 2019-081264 A | | 5/2019 | |
| JP | 2021-104600 A | | 7/2021 | |
| JP | 2021-154608 A | | 10/2021 | |
| WO | 2004/026552 A | | 4/2004 | |
| WO | WO-2022106631 A1 | * | 5/2022 | ........... B29C 64/106 |

OTHER PUBLICATIONS

Suzuki K. et al. "English Machine Translation of JP-2000167896-A". EPO. Espacenet. 2024. (Year: 2024).*
Sato S. et al. "English Machine Translation of JP H11156902 A". EPO. Espacenet. 2024. (Year: 2024).*

* cited by examiner

MATERIAL DELIVERY DEVICE, THREE-DIMENSIONAL SHAPING DEVICE, AND INJECTION MOLDING DEVICE

The present application is based on, and claims priority from JP Application Serial Number 2021-104749, filed Jun. 24, 2021, the disclosure of which is hereby incorporated by reference herein in its entirety.

BACKGROUND

1. Technical Field

The present disclosure relates to a material delivery device, a three-dimensional shaping device, and an injection molding device.

2. Related Art

Regarding a material delivery device that plasticizes a material and delivers the material to an outside, JP-A-H6-198689 describes a technique in which a pressure of an injection resin injected into a mold by a plunger is detected by a pressure detection unit.

In a device as in JP-A-H6-198689, by controlling a mechanism such as the plunger based on the detected pressure, for example, excess or deficiency of the material delivered from the device can be prevented, and defects of a product or the like formed by the delivered material can be prevented. In this case, in order to control the mechanism more accurately based on the pressure, it is preferable to detect a pressure of a resin in a flow path or the like near the mechanism. However, for example, when a heat source is provided near a portion where the pressure is desired to be detected, or when a space for providing the pressure detection unit cannot be allocated near that portion, the pressure in that portion may not be detected.

SUMMARY

According to a first aspect of the present disclosure, a material delivery device is provided. The material delivery device includes: a plasticization unit having a screw and configured to plasticize a material by rotation of the screw to produce a plasticized material; a flow path through which the plasticized material flows; a nozzle having a nozzle opening that communicates with the flow path and delivers the plasticized material to an outside; a cylinder coupled to the flow path; a rod inserted into the cylinder; and a first pressure detection unit configured to detect a pressure of the plasticized material in the flow path via the rod. The rod has a rod end surface facing the flow path in a longitudinal direction of the rod, and a transmission unit farther from the flow path than the rod end surface, and transmits a force due to the pressure received at the rod end surface to the first pressure detection unit via the transmission unit.

According to a second aspect of the present disclosure, a three-dimensional shaping device is provided. The three-dimensional shaping device includes: the material delivery device in the above aspect; a stage configured to deposit the plasticized material delivered from the nozzle; a control unit configured to control the material delivery device; and a delivery amount adjustment unit disposed, in the flow path, upstream of a coupling portion between the flow path and the cylinder and configured to adjust a flow rate of the plasticized material delivered from the nozzle opening.

According to a third aspect of the present disclosure, an injection molding device is provided. The injection molding device includes: the material delivery device in the above aspect; and a control unit configured to control the material delivery device, in which the nozzle delivers the plasticized material to a molding mold.

DESCRIPTION OF EXEMPLARY EMBODIMENTS

A. First Embodiment

Figure 1:
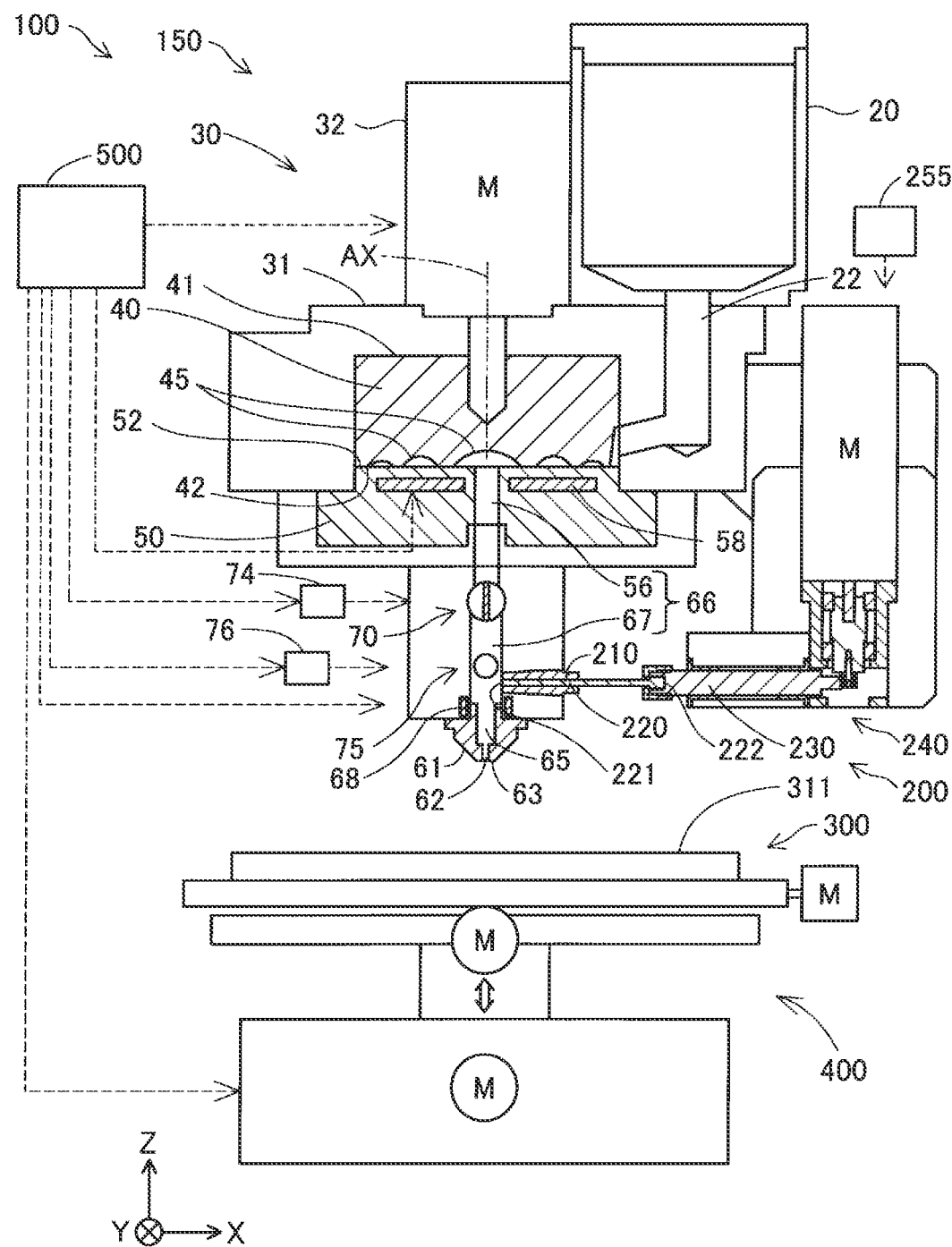
FIG. 1 is a diagram illustrating a schematic configuration of a three-dimensional shaping device of a first embodiment.

FIG. 1 is a diagram illustrating a schematic configuration of a three-dimensional shaping device 100 according to the present embodiment. FIG. 1 shows arrows along X, Y, and Z directions which are orthogonal to each other. The X, Y, and Z directions are directions along an X-axis, a Y-axis, and a Z-axis, which are three spatial axes orthogonal to each other, and each include a direction on one side along the X-axis, the Y-axis, or the Z-axis and a direction opposite thereto. The X-axis and the Y-axis are axes along a horizontal plane, and the Z-axis is an axis along a vertical line. In other drawings, arrows along the X, Y, and Z directions are also appropriately represented. The X, Y, and Z directions in FIG. 1 and the X, Y, and Z directions in the other figures represent the same directions. In the following description, the directions are specified by defining a positive direction indicated by an arrow as "+", a negative direction at an opposite side as "−", and a positive sign and a negative sign are used in combination in a direction notation.

The three-dimensional shaping device 100 of the present embodiment includes a material delivery device 150, a stage 300, a position change unit 400, and a control unit 500.

The control unit 500 controls an operation of the entire three-dimensional shaping device 100 to execute shaping processing for shaping a three-dimensional shaped object. The control unit 500 is implemented by a computer including one or a plurality of processors and a main storage device. The control unit 500 performs various functions by, for example, executing, by the processor, a program read into the main storage device. Some of the functions of the control unit 500 may be implemented by a hardware circuit. In the shaping processing executed by the control unit 500, the material delivery device 150 and the position change unit 400 are controlled according to shaping data of the three-dimensional shaped object.

Under control of the control unit 500, the material delivery device 150 melts a material in a solid state and delivers a plasticized material in a form of a paste to an outside. In the present embodiment, the material delivery device 150 discharges the plasticized material onto the stage 300 for shaping, which is a base of the three-dimensional shaped object. The material delivery device 150 includes a material supply unit 20 that is a supply source of the material before being converted into the plasticized material, a plasticization unit 30 that plasticizes the material by rotation of a screw 40 to produce the plasticized material, a flow path 66 through which the produced plasticized material flows, a nozzle 61 that communicates with the flow path 66 and delivers the plasticized material to the outside, and a pressure detection unit 200 that is coupled to the flow path 66 and detects a pressure of the plasticized material in the flow path 66. Further, in the present embodiment, a delivery amount adjustment unit 70 is disposed in the flow path 66, and an aspiration and discharge unit 75 is coupled to the flow path 66.

The material supply unit 20 accommodates the material in a form of pellets, powders, or the like. In the present embodiment, an ABS resin formed into a pellet shape is used as the material. The material supply unit 20 in the present embodiment is implemented by a hopper. A supply path 22 that couples the material supply unit 20 to the plasticization unit 30 is provided below the material supply unit 20. The material supply unit 20 supplies the material to the plasticization unit 30 via the supply path 22.

The plasticization unit 30 includes a screw case 31, a drive motor 32, the screw 40, a barrel 50, and a plasticizing heater 58. The plasticization unit 30 plasticizes at least a part of the material supplied from the material supply unit 20 by rotation of the screw 40 to produce the paste-shaped plasticized material having fluidity. Then, the plasticization unit 30 supplies the produced plasticized material to the nozzle 61 via the flow path 66 provided between the screw 40 and the nozzle 61. A term "plasticization" is a concept including melting, and is a change from a solid state to a state having fluidity. Specifically, in a case of the material in which glass transition occurs, the plasticization refers to setting a temperature of the material to be equal to or higher than a glass transition point. In a case of the material in which the glass transition does not occur, the plasticization refers to setting the temperature of the material to be equal to or higher than a melting point. The screw 40 of the present embodiment is a so-called flat screw, and may be referred to as "scroll".

The screw case 31 is a housing for accommodating the screw 40. The barrel 50 is fixed to a lower surface of the screw case 31, and the screw 40 is accommodated in a space surrounded by the screw case 31 and the barrel 50. On a surface facing the barrel 50, the screw 40 has a groove forming surface 42 on which grooves 45 are formed. The drive motor 32 is fixed to an upper surface of the screw case 31. A rotation shaft of the drive motor 32 is coupled to an upper surface 41 side of the screw 40. The drive motor 32 may not be directly coupled to the screw 40, and for example, the screw 40 and the drive motor 32 may be coupled to each other via a speed reducer. The drive motor 32 is driven under the control of the control unit 500.

The barrel 50 is disposed below the screw 40. The barrel 50 has a screw facing surface 52 facing the groove forming surface 42 of the screw 40. The barrel 50 is provided with a communication hole 56 on a central axis AX of the screw 40. In the present embodiment, the communication hole 56 forms a part of the flow path 66. More specifically, the flow path 66 is formed by the communication hole 56 and a supply flow path 67. The supply flow path 67 is a flow path coupling the communication hole 56 and the nozzle 61. In another embodiment, the supply flow path 67 may not be provided, and the communication hole 56 and the nozzle 61 may be directly coupled to each other.

In the present embodiment, the plasticizing heater 58 is built in the barrel 50 at a position facing the grooves 45 of the screw 40. The plasticizing heater 58 heats the material supplied between the screw 40 and the barrel 50. A temperature of the plasticizing heater 58 is controlled by the control unit 500.

Figure 2:
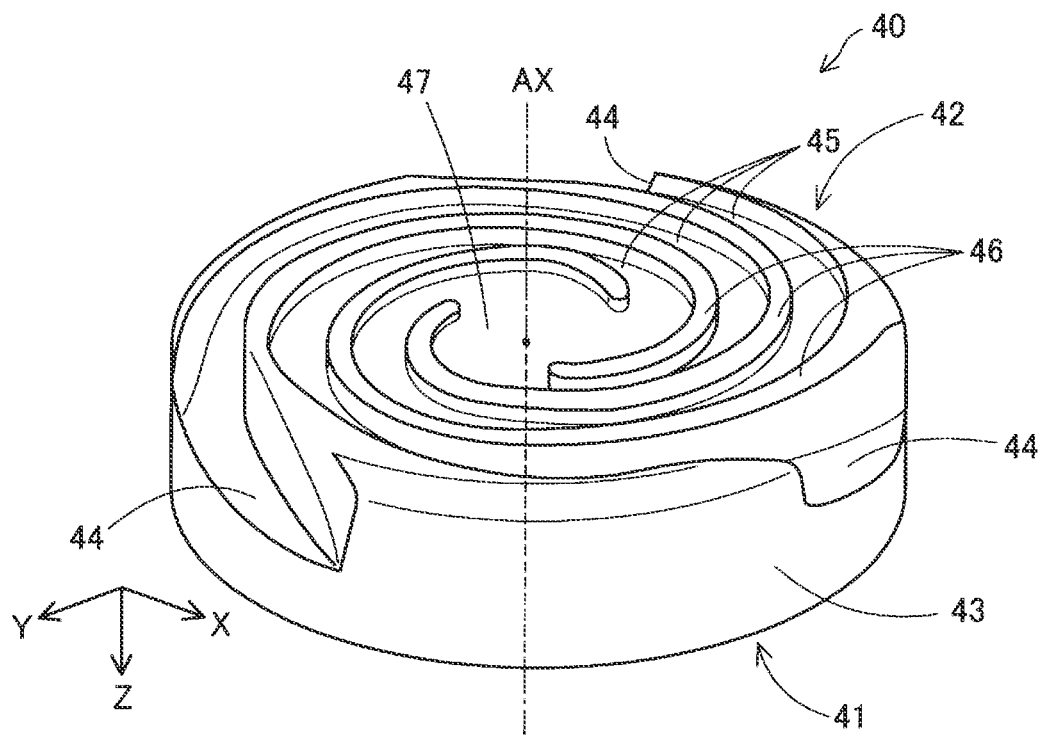
FIG. 2 is a schematic perspective view illustrating a configuration of a groove forming surface side of a screw.

FIG. 2 is a schematic perspective view illustrating a configuration of a groove forming surface 42 side of the screw 40. A central portion 47 of the groove forming surface 42 of the screw 40 is a recess to which one ends of the grooves 45 is coupled. The central portion 47 faces the communication hole 56 of the barrel 50 illustrated in FIG. 2. The central portion 47 intersects the central axis AX. The groove 45 constitutes a so-called scroll groove. The groove 45 extends in a spiral shape in a manner of drawing an arc from the central portion 47 toward an outer periphery of the screw 40. The groove forming surface 42 is provided with ridge portions 46 that constitute side wall portions of the grooves 45 and extend along the grooves 45. The groove 45 is continuous to a material introduction port 44 formed in a side surface 43 of the screw 40. The material introduction port 44 is a portion for receiving the material supplied via the supply path 22 of the material supply unit 20. The material received by the material introduction port 44 is supplied between the screw 40 and the barrel 50. As illustrated in FIG. 2, in the present embodiment, three grooves 45 are formed by being separated from one another by the ridge portions 46. The number of the grooves 45 is not limited to three, and may be one or two or more. A shape of the grooves 45 is not limited to a spiral shape, and may be a helical shape or an involute curve shape, or may be a shape extending in the manner of drawing the arc from the central portion 47 toward the outer periphery.

Figure 3:
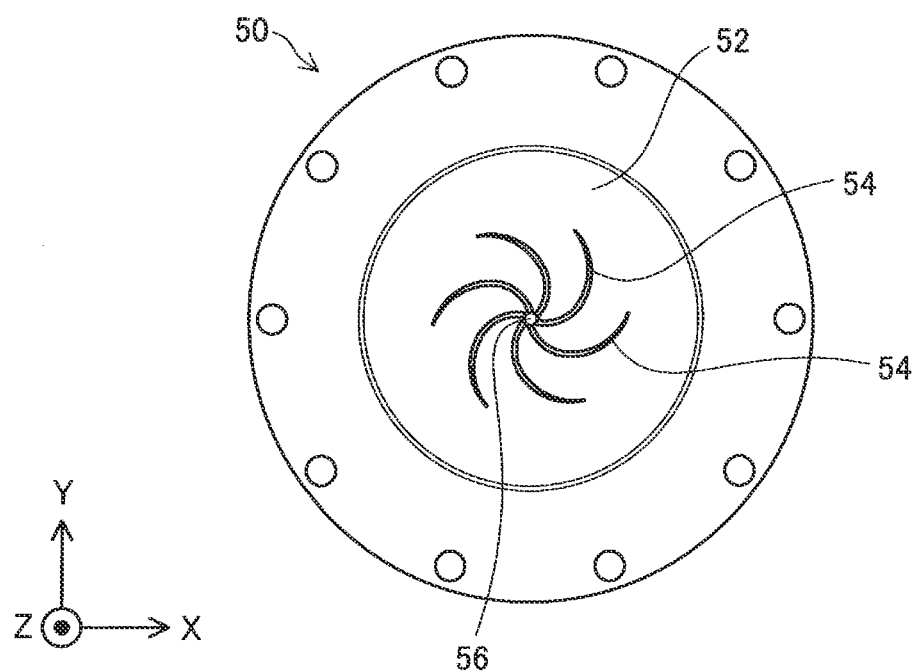
FIG. 3 is a diagram illustrating a configuration of a screw facing surface side of a barrel.

FIG. 3 is a top view illustrating a configuration of a screw facing surface 52 side of the barrel 50. As described above, the communication hole 56 is formed in a center of the screw facing surface 52. A plurality of guide grooves 54 are formed around the communication hole in the screw facing surface 52. Each of the guide grooves 54 has one end coupled to the communication hole 56 and extends in the spiral shape from the communication hole 56 toward an outer periphery of the screw facing surface 52. Each of the guide grooves 54 has a function of guiding the plasticized material to the communication hole 56. One end of the guide groove 54 may not be coupled to the communication hole 56. The guide groove 54 may not be formed in the barrel 50.

The plasticization unit 30 of the present embodiment heats the material supplied between the screw 40 and the barrel 50 while conveying the material toward the flow path 66 by the screw 40, the barrel 50, and the plasticizing heater 58 described above to produce the plasticized material, and supplies the produced plasticized material to the nozzle 61 through the flow path 66.

As illustrated in FIG. 1, the nozzle 61 includes a nozzle flow path 65 and a tip surface 63 provided with a nozzle opening 62. The nozzle flow path 65 is a flow path of the plasticized material formed in the nozzle 61, and communicates with the flow path 66 described above. More specifically, in the present embodiment, the nozzle flow path 65 is coupled to the supply flow path 67 described above. The tip surface 63 is a surface constituting a tip portion of the nozzle 61 that protrudes in a −Z direction toward a shaping surface 311. The nozzle opening 62 is provided at an end portion of the nozzle flow path 65 on a side communicating with the atmosphere, and is a portion where a flow path cross section of the nozzle flow path 65 is reduced. The plasticized material produced by the plasticization unit 30 is supplied to the nozzle 61 via the flow path 66 and is discharged from the nozzle opening 62 via the nozzle flow path 65.

In the present embodiment, a nozzle heater 68 is provided around the nozzle flow path 65. The nozzle heater 68 heats the nozzle 61 and the plasticized material inside the nozzle flow path 65 under the control of the control unit 500. The control unit 500 can control an output of the nozzle heater 68 to adjust fluidity of the plasticized material in the nozzle flow path 65. In the present embodiment, a set temperature of the nozzle heater 68 is set to a temperature higher than a set temperature of the plasticizing heater 58 of the plasticization unit 30 described above.

The delivery amount adjustment unit 70 adjusts a flow rate of the plasticized material delivered from the nozzle opening 62. The flow rate of the plasticized material delivered from the nozzle opening 62 to the outside is also referred to as a delivery amount. In the present embodiment, the delivery amount adjustment unit 70 is implemented by a butterfly valve that changes an opening degree of the flow path 66 by rotating in the flow path 66, and is disposed in the supply flow path 67 of the flow path 66. The delivery amount adjustment unit 70 is driven by a first drive unit 74 implemented by a stepping motor or the like under the control of the control unit 500. The control unit 500 controls a rotation angle of the butterfly valve by using the first drive unit 74 to adjust the opening degree of the flow path 66. Accordingly, the control unit 500 can adjust the flow rate of the plasticized material flowing from the plasticization unit 30 to the nozzle 61 and can adjust the delivery amount. The delivery amount adjustment unit 70 can also set the opening degree of the flow path 66 to 0 to set the delivery amount to 0. That is, the delivery amount adjustment unit 70 adjusts the delivery amount and controls ON or OFF of delivery of the plasticized material.

The aspiration and discharge unit 75 is coupled between the delivery amount adjustment unit 70 and the nozzle opening 62 in the flow path 66. The aspiration and discharge unit 75 performs an aspiration operation of aspirating the plasticized material in the flow path 66 and a discharge operation of pushing the aspirated plasticized material toward the nozzle opening 62. In the present embodiment, the aspiration and discharge unit 75 is implemented by a plunger. The aspiration and discharge unit 75 retracts the plunger in a direction away from the flow path 66 in the aspiration operation described above, and advances the plunger in a direction approaching the flow path 66 in the discharge operation. The aspiration and discharge unit 75 is driven by a second drive unit 76 under the control of the control unit 500. The second drive unit 76 is implemented by, for example, a stepping motor or a rack-and-pinion mechanism that converts a rotational force of a stepping motor into a translational motion of a plunger.

In the present embodiment, the control unit 500 executes the aspiration operation performed by the aspiration and discharge unit 75 when the delivery of the plasticized material from the nozzle 61 is stopped, thereby preventing an elongating phenomenon in which the plasticized material drips like pulling a thread from the nozzle opening 62. In this case, the control unit 500 can more effectively prevent the elongating phenomenon by executing the aspiration operation after setting the opening degree of the flow path 66 to 0 by the delivery amount adjustment unit 70. The aspiration and discharge unit 75 enhances responsiveness of the delivery of the plasticized material from the nozzle 61 by performing the discharge operation performed by the aspiration and discharge unit 75 when the delivery of the plasticized material from the nozzle 61 is started or restarted. In this case, the control unit 500 can further enhance the responsiveness of the delivery of the plasticized material by executing the aspiration operation before setting the opening degree of the flow path 66 larger than 0 by the delivery amount adjustment unit 70.

The stage 300 is disposed at a position facing the tip surface 63 of the nozzle 61. The three-dimensional shaping device 100 delivers the plasticized material from the nozzle 61 toward the shaping surface 311 of the stage 300, and laminates layers of the plasticized material to form a three-dimensional shaped object.

The position change unit 400 changes a relative position of the material delivery device 150 and the stage 300 to change a relative position of the nozzle 61 and the stage 300. In the present embodiment, the position change unit 400 moves the stage 300 with respect to the material delivery device 150. The change in the relative position of the material delivery device 150 or the nozzle 61 with respect to the stage 300 may be simply referred to as movement of the material delivery device 150 or the nozzle 61. That is, for example, moving the stage 300 in a +X direction can also be rephrased as moving the material delivery device 150 or the nozzle 61 in a −X direction. The position change unit 400 in the present embodiment is implemented by a three-axis positioner that moves the stage 300 in three axial directions of the X, Y, and Z directions by driving forces of three motors. Each of the motors drives under the control of the control unit 500. The position change unit 400 may not be configured to move the stage 300, but may be configured to move the material delivery device 150 without moving the stage 300. In addition, the position change unit 400 may be configured to move both the stage 300 and the material delivery device 150.

Figure 4:
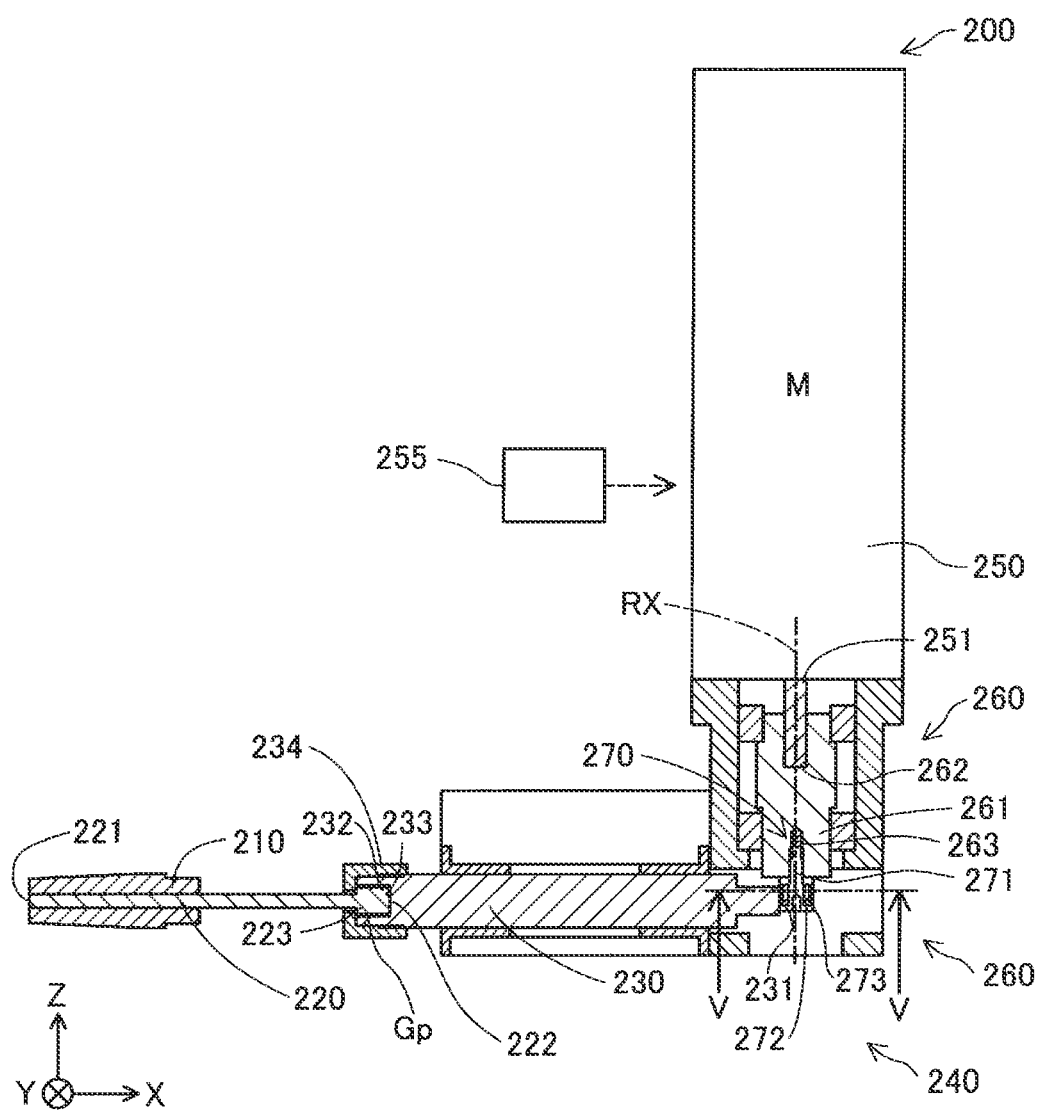
FIG. 4 is a diagram illustrating a schematic configuration of a pressure detection unit of the first embodiment.

FIG. 4 is a diagram illustrating a schematic configuration of the pressure detection unit 200. The pressure detection unit 200 includes a cylinder 210 coupled to the flow path 66, a rod 220 inserted into the cylinder 210, a first pressure detection unit 240 that detects the pressure of the plasticized material in the flow path 66 via the rod 220. Further, the pressure detection unit 200 in the present embodiment includes a force applying member 230. The first pressure detection unit 240 of the present embodiment detects the pressure of the plasticized material in the flow path 66 via the rod 220 and the force applying member 230.

The cylinder 210 of the present embodiment has a cylindrical shape with an axial direction of the cylinder 210 as a longitudinal direction. As illustrated in FIGS. and 4, the cylinder 210 is disposed such that the longitudinal direction of the cylinder 210 is along the X direction. As illustrated in FIG. 1, an end portion in a −X direction of the cylinder 210 opens in the −X direction toward the flow path 66. An end portion in a +X direction of the cylinder 210 is located in a +X direction of the flow path 66. The flow path 66 communicates with an outside of the flow path 66 in the X direction via the cylinder 210.

In the present embodiment, the cylinder 210 is coupled to the flow path 66 downstream of the delivery amount adjustment unit 70. That is, the delivery amount adjustment unit 70 is disposed, in the flow path 66, upstream of the coupling portion between the flow path 66 and the cylinder 210. The cylinder 210 is coupled to the flow path 66 downstream of the aspiration and discharge unit 75. In another embodiment, the cylinder 210 may be coupled to, for example, the flow path 66 upstream of the aspiration and discharge unit 75.

The rod 220 has an axial shape with an axial direction of the rod 220 as a longitudinal direction. In the present embodiment, the rod 220 is implemented by tool steel. As illustrated in FIGS. 1 and 4, the rod 220 is inserted into the cylinder 210 such that the longitudinal direction of the rod 220 is along the X direction. The rod 220 has a rod end surface 221 and a transmission unit 222 farther from the flow path 66 than the rod end surface 221 in the X direction. In the present embodiment, the rod end surface 221 is an end surface in a −X direction of the rod 220. As illustrated in FIG. 1, the rod end surface 221 faces the flow path 66 in the cylinder 210. In the present embodiment, the transmission unit 222 is an end surface at an opposite side of the rod end surface 221 in the longitudinal direction of the rod 220, and is an end surface in a +X direction of the rod 220. As illustrated in FIG. 4, in the present embodiment, the rod 220 has a joint unit 223 having a larger diameter at an end portion in the +X direction than other portions of the rod 220 in the X direction. In the present embodiment, the transmission unit 222 is an end surface in a +X direction of the joint unit 223. As illustrated in FIGS. 1 and 4, the transmission unit 222 is in contact with the force applying member 230 in the X direction at a position in the +X direction of the cylinder 210.

From a viewpoint of preventing leakage of the plasticized material in the flow path 66 to the outside through a gap between the rod 220 and the cylinder 210, a distance between a side surface of the rod 220 and an inner surface of the cylinder 210 is, for example, preferably 50 μm or less, more preferably 20 μm or less, and further preferably 10 μm or less. Further, from a viewpoint of discharging a gas generated from the plasticized material in the flow path 66 to the outside of the flow path 66 through the gap between the rod 220 and the cylinder 210, the distance is, for example, preferably 5 μm or more.

As illustrated in FIGS. 1 and 4, the force applying member 230 is disposed between the rod 220 and the first pressure detection unit 240 in the X direction. The force applying member 230 has an axial shape with an axial direction of the force applying member 230 as a longitudinal direction, and is disposed such that the longitudinal direction is along the X direction. In the present embodiment, the force applying member 230 is made of stainless steel. A force applying surface 231 which is an end surface in the +X direction of the force applying member 230 is in contact with the first pressure detection unit 240. As illustrated in FIG. 4, a recess 232 that opens in the −X direction is formed at an end portion of the force applying member 230 in the −X direction. A tip portion of the rod 220 in the +X direction described above is inserted into the opening of the recess 232. In the opening of the recess 232, the transmission unit 222 of the rod 220 is in contact with a bottom 233 of the recess 232 in the X direction. The rod 220 and the force applying member 230 are coupled by a joint 234 that covers a side surface of the end portion of the force applying member 230 in the −X direction. The joint 234 has a shape that is engaged with a surface in a −X direction of the joint unit 223 of the rod 220, and restricts movement of the rod 220 with respect to the force applying member 230 in the −X direction.

In the present embodiment, a gap Gp is formed between a side surface of the joint unit 223 of the rod 220 and an inner surface of the recess 232. Therefore, the rod 220 is in contact with the force applying member 230 in the X direction, but not in contact with the force applying member 230 in the Y direction or the Z direction. Accordingly, for example, as compared with a case where the gap Gp is not provided between the rod 220 and the force applying member 230, heat of the plasticized material in the flow path 66 is prevented from being transferred to the force applying member 230 via the rod 220, and the heat of the plasticized material is further prevented from being transferred to the first pressure detection unit 240. In addition, for example, as compared with an aspect in which the rod 220 and the first pressure detection unit 240 are in direct contact with each other without the force applying member 230, the heat of the plasticized material can be prevented from being transferred to the first pressure detection unit 240. In the present embodiment, a gap is also formed between the side surface of the rod 220 and the joint unit 223.

The rod 220 transmits the pressure of the plasticized material in the flow path 66 to the first pressure detection unit 240. More specifically, the rod 220 receives a force in the +X direction due to the pressure of the plasticized material in the flow path 66 at the rod end surface 221 and transmits the force to the force applying member 230 via the transmission unit 222. The force transmitted to the force applying member 230 via the transmission unit 222 is transmitted to the first pressure detection unit 240 via the force applying surface 231 of the force applying member 230. Hereinafter, the force transmitted to the first pressure detection unit 240 via the transmission unit 222 in this way may be referred to as a detection force.

As illustrated in FIG. 4, the first pressure detection unit 240 includes a motor 250 having an output shaft 251 and a torque member 260 coupled to the output shaft 251.

In the present embodiment, the motor 250 is provided with the output shaft 251 toward a −Z direction such that the output shaft 251 is along the Z direction orthogonal to the longitudinal direction of the rod 220. The motor 250 is implemented by a servo motor. The first pressure detection unit 240 includes a controller 255 for servo-controlling the motor 250. In the present embodiment, the drive of the motor 250 is controlled by the control unit 500 via the controller 255.

In the present embodiment, the controller 255 performs position holding control for feedback control so as to hold a rotational position of the output shaft 251. More specifically, when the drive of the motor 250 is stopped and a torque is applied to the output shaft 251 from the outside, the controller 255 regulates a change in the rotational position of the output shaft 251 by generating a torque in a direction opposite to the applied torque in the output shaft 251. In addition, when the rotational position of the output shaft 251 is changed by the torque applied from the outside, similarly, the rotational position of the output shaft 251 returns to an original position by generating the torque in the direction opposite to the applied torque in the output shaft 251. Such position holding control is also referred to as a servo lock. Hereinafter, the torque for holding the rotational position of the output shaft 251 in the position holding control is also referred to as a position holding torque.

Figure 5:
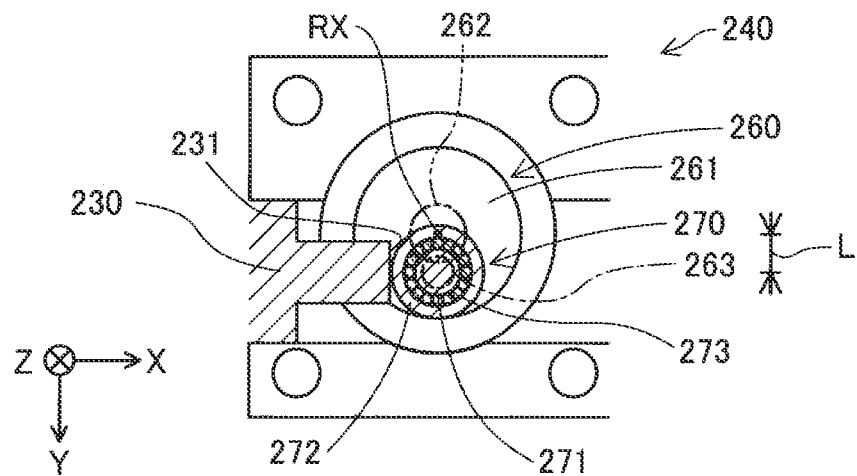
FIG. 5 is a diagram illustrating a V-V cross section in FIG. 4.

FIG. 5 is a diagram illustrating a V-V cross section in FIG. 4. As illustrated in FIGS. 4 and 5, the torque member 260 includes a coupling portion 261 and a receiving unit 270.

The coupling portion 261 in the present embodiment is a substantially columnar member disposed along the Z direction. The coupling portion 261 is formed with a coupling hole 262 for coupling the output shaft 251 of the motor 250 and a fixing hole 263 for fixing the receiving unit 270. As illustrated in FIG. 4, the coupling hole 262 opens in a +Z direction at an end portion of the coupling portion 261 in the +Z direction. The fixing hole 263 opens in a −Z direction at the end portion of the coupling portion 261 in the −Z direction. In FIG. 5, a position of the coupling hole 262 in the X and Y directions is indicated by a two-dot chain line, and similarly, a position of the fixing hole 263 is indicated by a one-dot chain line. As illustrated in FIG. 5, the coupling hole 262 is formed in a central portion of the coupling portion 261 when viewed along the Z direction. The fixing hole 263 is formed at a position deviated from the central portion of the coupling portion 261 when viewed along the Z direction. Therefore, the fixing hole 263 is located at a position deviated from a rotation shaft RX of the output shaft 251 when viewed along the Z direction. For example, depending on a shape of the output shaft 251, the coupling hole 262 may be formed, for example, in a shape corresponding to a D-cut shape or a shape corresponding to a keyway shape.

In the present embodiment, the receiving unit 270 is implemented by a cam follower and includes a shaft 271 and an outer ring 272. The cam follower is also referred to as a track follower. An end portion in a +Z direction of the shaft 271 is inserted into the fixing hole 263 of the coupling portion 261 described above. The outer ring 272 is rotatably supported on a spot around the shaft 271 by a bearing 273 fixed to a side surface of the shaft 271. The outer ring 272 and the bearing 273 are disposed in a −Z direction of the coupling portion 261. The bearing 273 may be, for example, a ball bearing or a needle bearing.

As described above, the fixing hole 263 is formed at a position deviated from the rotation shaft RX. Therefore, as illustrated in FIG. 5, the receiving unit 270 is disposed at a position deviated from the rotation shaft RX when viewed along the Z direction. More specifically, in the present embodiment, the receiving unit 270 is disposed at a position deviated by a distance L in a −Y direction from the rotation shaft RX when viewed along the Z direction.

The torque member 260 receives the detection force described above and applies a torque generated by the detection force to the output shaft 251. The torque member 260 in the present embodiment receives the detection force by the outer ring 272 of the receiving unit 270, thereby generating a rotational force that rotates the coupling portion 261 coupled to the output shaft 251, and applies the torque generated by this rotational force to the output shaft 251. Hereinafter, the torque applied to the output shaft 251 and generated by the detection force may be referred to as a detection torque.

The first pressure detection unit 240 of the present embodiment detects the pressure of the plasticized material in the flow path 66 based on a current value or a voltage value of the motor 250 generated by the detection torque applied to the output shaft 251. More specifically, in a state where the position holding control is performed by the controller 255 described above, the first pressure detection unit 240 detects a voltage value for generating the position holding torque according to the detection torque, and detects the pressure of the plasticized material in the flow path 66 based on the detected voltage value. As a result, the first pressure detection unit 240 can detect the pressure while restricting the movement of the rod 220 and the force applying member 230 in the +X direction.

More specifically, assuming that the pressure of the plasticized material in the flow path 66 is a pressure P, the pressure P is expressed by the following Formula (1) in the present embodiment.

$$P=(V \cdot T)/(L \cdot S \cdot \cos \theta)(0<\theta<180°) \quad (1)$$

A voltage V represents the voltage value of the motor 250 when the detection torque is applied to the output shaft 251. A torque T represents a rated torque of the motor 250. An area S represents an area of the rod end surface 221 of the rod 220. An angle θ represents an angle formed by a transmission direction Df of the detection force and a rotation direction Dr of rotation, around the output shaft 251, of the torque member 260 receiving the detection force. In the present embodiment, both the transmission direction Df and the rotation direction Dr are in the +X direction, and thus e is 0°. Therefore, in the present embodiment, the above Formula (1) has the same value as the following Formula (2).

$$P=(V \cdot T)/(L \cdot S) \quad (2)$$

Figure 6:
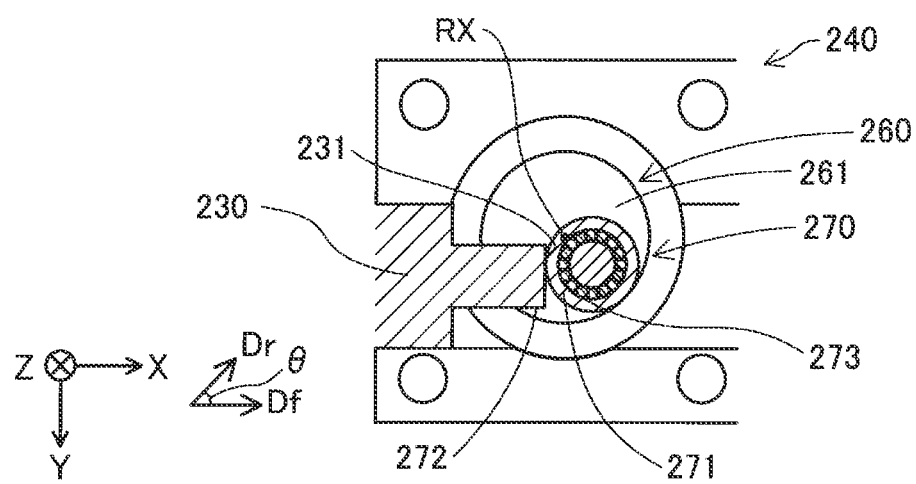
FIG. 6 is a diagram illustrating an example of transmission of a detection torque of another embodiment.

FIG. 6 is a diagram illustrating an example of transmission of the detection torque in another embodiment. FIG. 6 illustrates that when viewed in the +Z direction, the force applying member 230 and the receiving unit 270 are in contact with each other in a state where the torque member 260 rotates counterclockwise as compared with the case of FIG. 5. In an example illustrated in FIG. 6, since the transmission direction Df and the rotation direction Dr do not match, when the torque member 260 receives the detection force, only a component of the rotation direction Dr of the received detection force contributes to an application of the detection torque to the output shaft 251.

As shown in Formulas (1) and (2) described above, when the same pressure P is detected, the smaller the distance L, the smaller the voltage V generated in the motor 250 when the pressure P is detected. Therefore, by making the distance L smaller, a load generated on the motor 250 when the pressure P is detected can be reduced. In detection of the pressure P, since it is preferable that the voltage V generated in the motor 250 is equal to or less than the rated voltage of the motor 250, it can be rephrased that a range of values of the detectable pressure P can be widened by reducing the distance L. By increasing the distance L, a change width of the voltage V with respect to the change of the pressure P becomes large, and thus a resolution of the detected pressure P can be improved.

The control unit 500 controls the operations of the aspiration and discharge unit 75 described above based on the pressure value detected by the first pressure detection unit 240. In the present embodiment, the control unit 500 adjusts an operation timing, or an operation speed, a backward distance, a forward distance, and the like of the plunger of the aspiration and discharge unit 75 in the aspiration operation or the discharge operation based on the detected pressure value. For example, in the aspiration operation, the control unit 500 advances a start timing of retreat of the plunger or increases a retreat speed as the detected pressure value becomes higher, so that the responsiveness of stopping the delivery of the plasticized material from the nozzle opening 62 can be further enhanced. In addition, in a delivery operation, the control unit 500 advances a start timing of forwarding of the plunger or increases a forward speed as the detected pressure value becomes lower, so that the responsiveness of starting the delivery of the plasticized material from the nozzle opening 62 can be further enhanced. In addition, the control unit 500 may feedback-control the aspiration and discharge unit 75 based on, for example, the detected pressure value. In this case, the control unit 500 may execute, for example, the aspiration operation when the pressure of the plasticized material in the flow path 66 becomes too high, and execute the discharge operation when the pressure becomes too low. Further, for example, based on the detected pressure value, the control unit 500 may feedback-control the delivery amount adjustment unit 70 to adjust the flow rate of the plasticized material in the flow path 66.

According to the three-dimensional shaping device 100 in the present embodiment described above, the rod 220 transmits the force due to the pressure of the plasticized material received at the rod end surface 221 to the first pressure detection unit 240 via the transmission unit 222, and the first pressure detection unit 240 detects the pressure of the plasticized material in the flow path 66 via the rod 220. Accordingly, the first pressure detection unit 240 can indirectly measure the pressure of the plasticized material in the flow path 66 via the rod 220. Therefore, even if the heat source is provided near a portion where the pressure is to be measured, or if the provided space near the portion is limited, there is a high possibility that the pressure can be detected in that portion.

In the present embodiment, the first pressure detection unit 240 includes the motor 250 having the output shaft 251 and the torque member 260 that applies the detection torque due to the received detection force to the output shaft 251, and the first pressure detection unit 240 detects the pressure of the plasticized material in the flow path 66 based on the current value or the voltage value of the motor 250 generated by the detection torque. Accordingly, the pressure of the plasticized material in the flow path 66 can be detected by using the motor 250. Therefore, for example, as compared with a case where the first pressure detection unit 240 is implemented by a piezoelectric type sensor that measures the pressure by a piezoelectric effect of quartz or the like, a heat resistance of the first pressure detection unit 240 can be easily improved.

In the present embodiment, the torque member 260 includes the receiving unit 270 that receives the detection force at the position deviated from the rotation shaft RX of the output shaft 251 when viewed along the output shaft 251. Therefore, the torque member 260 can receive the detection force by the receiving unit 270 to easily apply the detection torque to the output shaft 25. By adjusting the distance L of the receiving unit 270 from the rotation shaft RX, the width and the resolution of the pressure value that can be detected by the first pressure detection unit 240 can be easily adjusted.

In the present embodiment, the receiving unit 270 is implemented by a cam follower. As a result, the detection force is transmitted to the receiving unit 270 more efficiently. Therefore, wear or breakage of the receiving unit 270 when the detection force is transmitted to the receiving unit 270 is prevented. In another embodiment, the receiving unit 270 may be implemented by a roller follower, and also in this case, the detection force is transmitted to the receiving unit 270 more efficiently, and the wear or breakage of the receiving unit 270 when the detection force is transmitted to the receiving unit 270 is prevented.

In the present embodiment, the screw 40 has a groove forming surface 42 in which the grooves 45 are formed, and the plasticization unit 30 includes the barrel 50 and the plasticizing heater 58. Accordingly, the plasticization unit 30 can be miniaturized, and thus the entire material delivery device 150 can be miniaturized.

In the present embodiment, the nozzle heater 68 is provided, and the set temperature of the nozzle heater is set higher than the set temperature of the plasticizing heater 58. Therefore, the nozzle heater 68 further enhances fluidity of the plasticized material in the nozzle 61, and the plasticized material can be efficiently delivered from the nozzle opening 62 to the outside. In addition, when a temperature of the flow path 66 or the like in the vicinity of the nozzle 61 is increased by the nozzle heater 68, the pressure of the plasticized material in the flow path 66 or the like in the vicinity of the nozzle 61 can be easily detected by the first pressure detection unit 240 via the rod 220.

In the present embodiment, the three-dimensional shaping device 100 includes the delivery amount adjustment unit 70 disposed, in the flow path 66, upstream of the coupling portion between the flow path 66 and the cylinder 210. Accordingly, the first pressure detection unit 240 can accurately detect the pressure of the plasticized material downstream of the delivery amount adjustment unit 70 in the flow path 66. In particular, also when the flow rate of the plasticized material downstream of the delivery amount adjustment unit 70 in the flow path 66 is adjusted to be smaller by the delivery amount adjustment unit 70, the pressure of the plasticized material downstream of the delivery amount adjustment unit 70 can be detected accurately. Therefore, as compared with a case where the pressure detection unit 200 is coupled upstream of the delivery amount adjustment unit 70 in the flow path 66, a mechanism or the like disposed downstream of the delivery amount adjustment unit 70 in the flow path 66 can be controlled more accurately based on the detected pressure. By controlling the delivery amount adjustment unit 70 based on the detected pressure, the delivery amount of the plasticized material delivered from the nozzle opening 62 toward the stage 300 can be adjusted more accurately.

In the present embodiment, the three-dimensional shaping device 100 includes the aspiration and discharge unit 75 coupled between the delivery amount adjustment unit 70 and the nozzle opening 62 in the flow path 66, and the control unit 500 controls the aspiration and discharge unit based on the value detected by the first pressure detection unit 240. Accordingly, both the pressure detection unit 200 and the aspiration and discharge unit 75 are coupled between the delivery amount adjustment unit 70 and the nozzle opening 62 in the flow path 66, and thus the aspiration and discharge unit 75 can be controlled more accurately based on the pressure detected by the first pressure detection unit 240. Therefore, the responsiveness of starting or stopping the delivery of the plasticized material from the nozzle opening 62 can be further enhanced.

B. Second Embodiment

Figure 7:
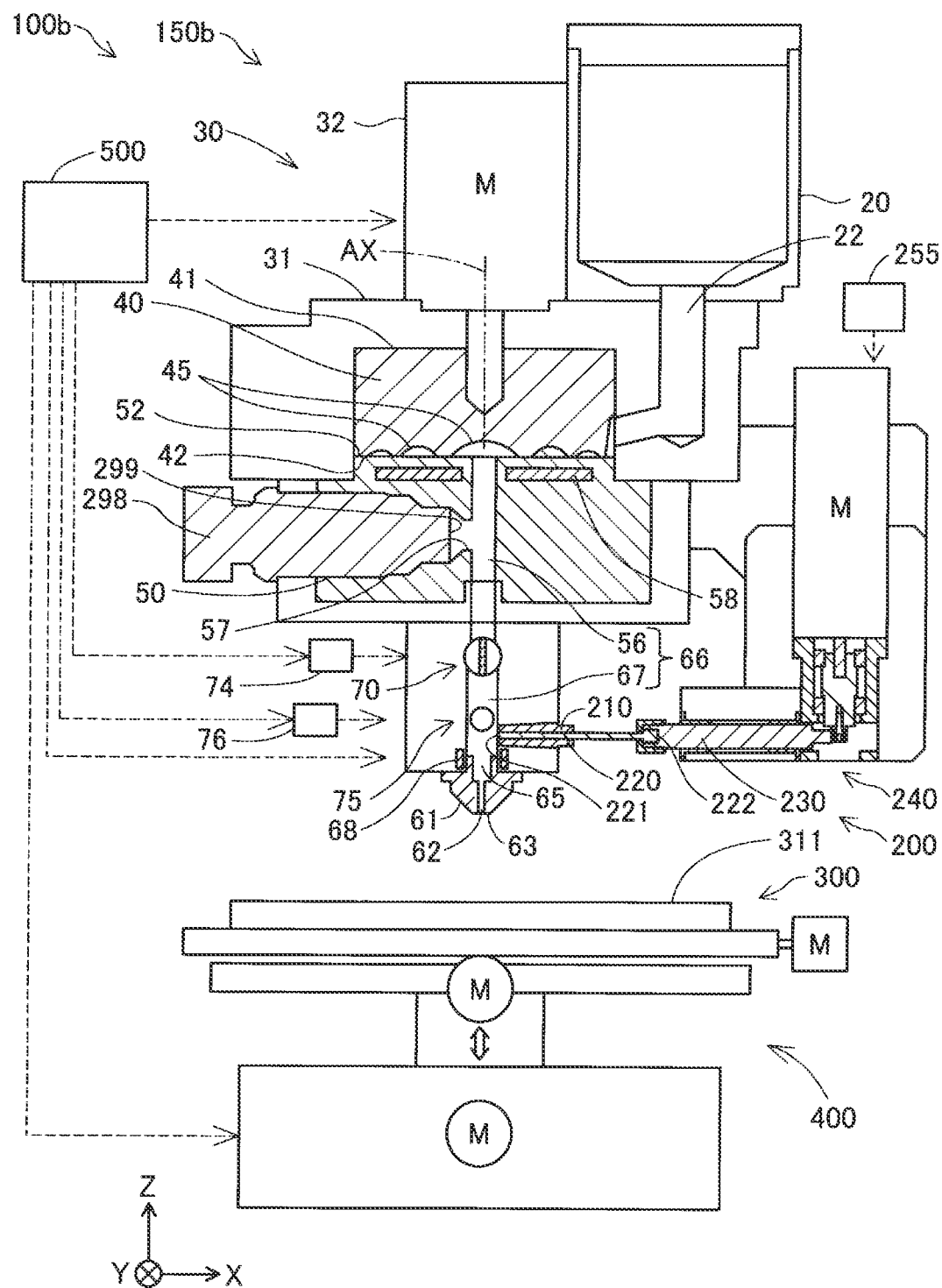
FIG. 7 is a diagram illustrating a schematic configuration of a three-dimensional shaping device of a second embodiment.

FIG. 7 is a diagram illustrating a schematic configuration of a three-dimensional shaping device 100b according to a second embodiment. The three-dimensional shaping device 100b of the present embodiment is different from that of the first embodiment and further includes a second pressure detection unit 298. A portion not specifically described in a configuration of the three-dimensional shaping device 100b has a similar configuration as that of the first embodiment.

The second pressure detection unit 298 detects the pressure of the plasticized material upstream of the delivery amount adjustment unit 70 in the flow path 66. In the present embodiment, the second pressure detection unit 298 is implemented by a diaphragm type pressure sensor. The second pressure detection unit 298 is inserted into a through hole 57 so as to close, from the −X direction, an inside of the through hole 57 penetrating the barrel 50 in the −X direction. A tip 299 in a +X direction of the second pressure detection unit 298 faces the communication hole 56 in the through hole 57. The second pressure detection unit 298 detects a plasticized material in the communication hole 56 by receiving a pressure of the plasticized material in the through hole 57 at the tip 299. In another embodiment, the second pressure detection unit 298 may detect the pressure of the plasticized material, for example, upstream of the delivery amount adjustment unit 70 in the supply flow path 67 instead of in the communication hole 56. In addition, the second pressure detection unit 298 may be implemented by, for example, a piezoelectric type pressure sensor, and may be configured to indirectly measure the pressure via the rod, similarly to the first pressure detection unit 240 of the pressure detection unit 200.

In the present embodiment, the control unit 500 controls the rotation of the screw 40 based on the pressure value detected by the second pressure detection unit 298. For example, the control unit 500 feedback-controls the drive motor 32 based on the value detected by the second pressure detection unit 298, so that the amount of the plasticized material produced by the plasticization unit 30 can be adjusted based on the pressure of the plasticized material upstream of the delivery amount adjustment unit 70 in the flow path 66.

According to the three-dimensional shaping device 100b of the present embodiment described above, even if the heat source is provided near the portion where the pressure is to be measured, or if the provided space near the portion is limited, there is a high possibility that the pressure can be measured in that portion. In particular, in the present embodiment, the second pressure detection unit 298 that detects the pressure of the plasticized material upstream of the delivery amount adjustment unit 70 in the flow path 66 is provided, and the control unit 500 controls the rotation of the screw 40 based on the value detected by the second pressure detection unit 298. According to such an aspect, the control unit 500 can adjust the amount of the plasticized material produced by the plasticization unit 30 based on the pressure of the plasticized material upstream of the delivery amount adjustment unit 70. Accordingly, in the flow path 66, the flow rate of the plasticized material upstream of the delivery amount adjustment unit 70 can be adjusted more accurately, and thus the flow rate of the plasticized material in the entire flow path 66 can be easily adjusted. Therefore, there is a high possibility that the delivery amount of the plasticized material delivered from the nozzle opening 62 can be adjusted more accurately.

C. Third Embodiment

Figure 8:
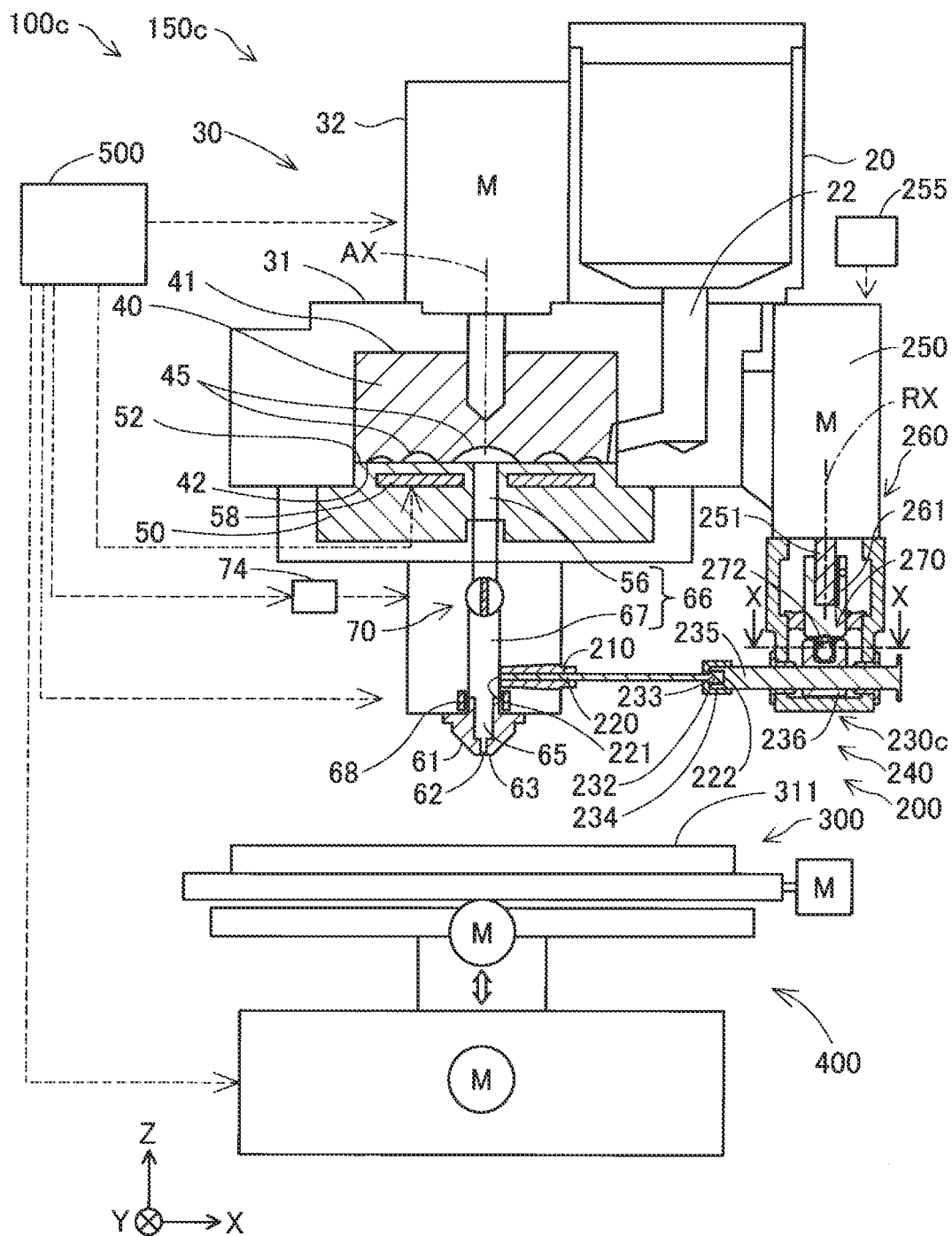
FIG. 8 is a diagram illustrating a schematic configuration of a three-dimensional shaping device of a third embodiment.

FIG. 8 is a diagram illustrating a schematic configuration of a three-dimensional shaping device 100c according to a third embodiment. In the present embodiment, the three-dimensional shaping device 100c is different from that of the first embodiment and does not include the aspiration and discharge unit 75. In the three-dimensional shaping device 100c, a pressure detection unit 200c detects the pressure of the plasticized material in the flow path 66 and exhibits the same function as the aspiration and discharge unit 75 in the first embodiment. A portion not specifically described in a configuration of the three-dimensional shaping device 100c has a similar configuration as that of the first embodiment.

As illustrated in FIG. 8, a force applying member 230c of the present embodiment is different from that of the first embodiment and further includes a shaft-shaped unit 235 and a sandwiching unit 236.

Figure 9:
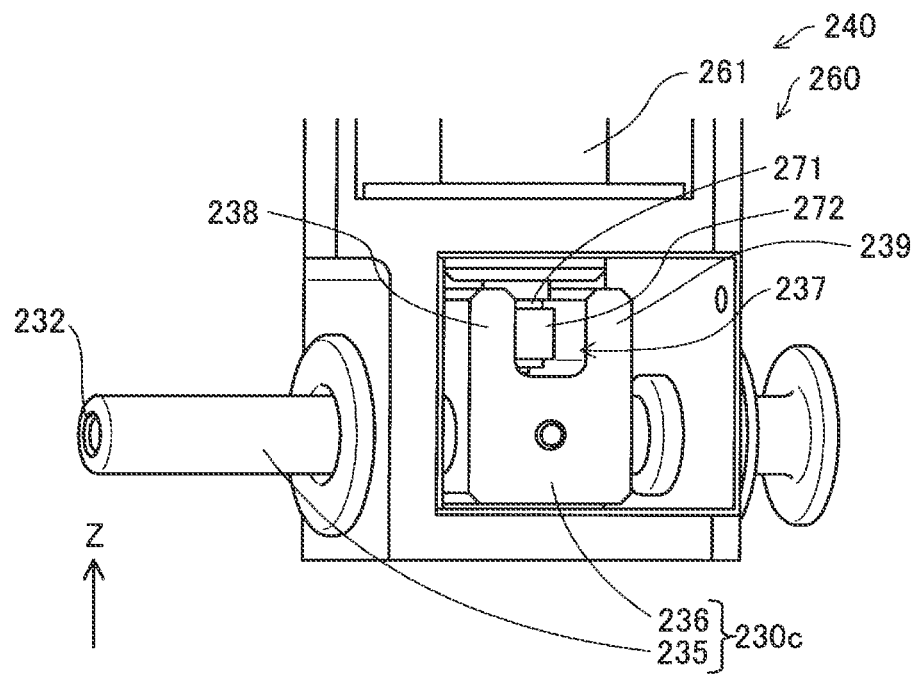
FIG. 9 is a perspective view illustrating a pressure detection unit of the third embodiment.
Figure 10:
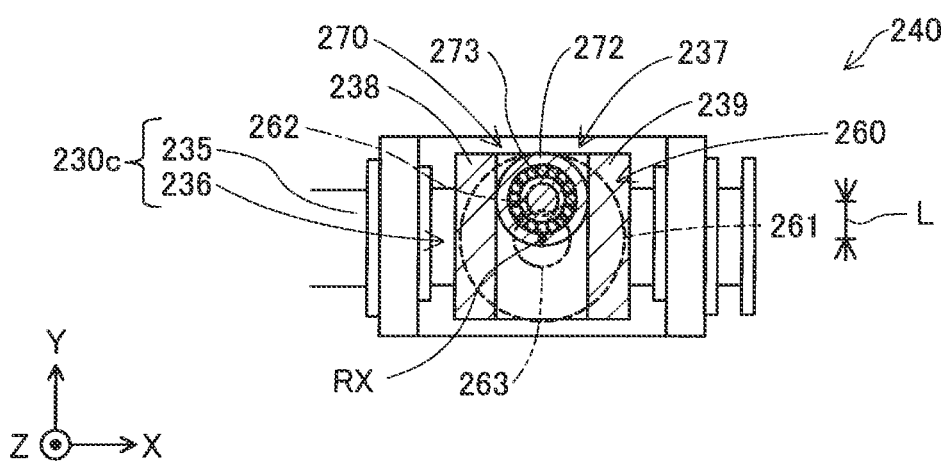
FIG. 10 is a diagram illustrating an X-X cross section in FIG. 8.

FIG. 9 is a perspective view illustrating a pressure detection unit 200c in the present embodiment. FIG. 10 is a diagram illustrating an X-X cross section in FIG. 8. In FIG. 10, similar to FIG. 5 described in the first embodiment, the position of the coupling hole 262 in the X and Y directions is indicated by a two-dot chain line, and the position of the fixing hole 263 in the X and Y directions is indicated by a one-dot chain line. In FIG. 10, a position of the coupling portion 261 in the X and Y directions is indicated by a broken line. As illustrated in FIGS. 8 and 9, the shaft-shaped unit 235 is a shaft-shaped member whose axial direction is the longitudinal direction, and is disposed such that the longitudinal direction is along the X direction. The recess 232 is formed at an end portion in a −X direction of the shaft-shaped unit 235, similar to the force applying member 230 in the first embodiment.

The sandwiching unit 236 is penetrated in the X direction by the shaft-shaped unit 235 and fixed to the shaft-shaped unit 235. A groove portion 237 is formed along the Y direction at an end portion in a +Z direction of the sandwiching unit 236. A first wall portion 238 is formed in a −X direction of the groove portion 237, and a second wall portion 239 is formed in a +X direction. An outer ring 272 of the receiving unit 270 is disposed in the groove portion 237. That is, the outer ring 272 is sandwiched between the first wall portion 238 and the second wall portion 239 in the X direction.

The force applying member 230c in the present embodiment transmits the detection force to the first pressure detection unit 240 via the sandwiching unit 236. More specifically, the force is transmitted to the shaft-shaped unit 235 of the force applying member 230c via the transmission unit 222 of the rod 220, so that the sandwiching unit 236 is pushed in the +X direction together with the shaft-shaped unit 235. Then, the first wall portion 238 of the sandwiching unit 236 is in contact with the outer ring 272 of the sandwiching unit 270 and pushes the outer ring 272 in the +X direction to transmit the detection force to the receiving unit 270. Accordingly, the torque member 260 can apply the detection torque to the output shaft 251.

Figure 11:
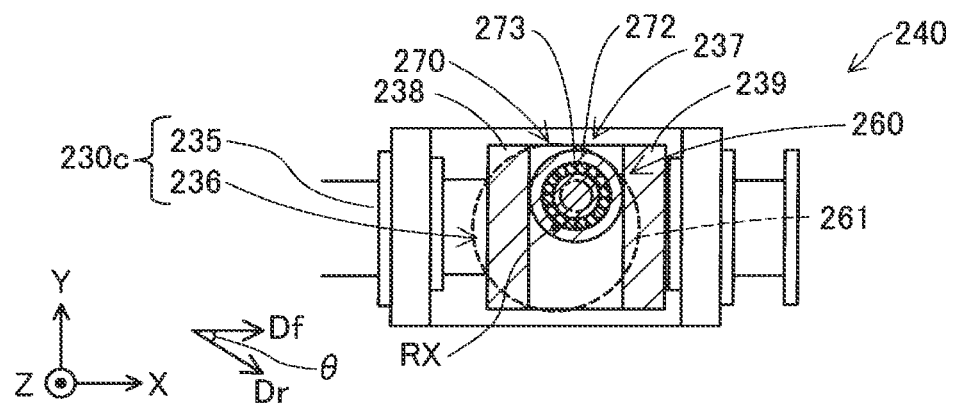
FIG. 11 is a diagram illustrating an operation of a first pressure detection unit of the third embodiment.

FIG. 11 is a diagram illustrating an operation of the first pressure detection unit 240 of the third embodiment. In the present embodiment, the control unit 500 drives the motor 250 of the first pressure detection unit 240 to cause the rod 220 to slide in the cylinder 210. For example, the control unit 500 causes the motor 250 to rotate clockwise and the torque member 260 to rotate clockwise when viewed along the −Z direction, so that as illustrated in FIG. 11, the second wall portion 239 of the sandwiching unit 236 can be pushed in the +X direction by the receiving unit 270 of the torque member 260. The force applying member 230c moves in the +X direction together with the sandwiching unit 236, and as the force applying member 230c moves, the rod 220 retreats in the +X direction away from the flow path 66. Accordingly, the plasticized material in the flow path 66 is aspirated into the cylinder 210. Similarly, the control unit 500 causes the motor 250 to rotate in a direction opposite to a direction where the rod 220 is retracted, so that the first wall portion 238 in the −X direction can be pushed by the torque member 260. Accordingly, the rod 220 advances in the −X direction approaching the flow path 66, and the plasticized material in the cylinder 210 is pushed to the nozzle opening 62. Thus, by operating the rod 220 in the cylinder 210, the control unit 500 can execute the aspiration operation and the discharge operation similar to the aspiration and discharge unit 75 described in the first embodiment.

In the present embodiment, the first pressure detection unit 240 detects the pressure of the plasticized material in the flow path 66 based on the current value or the voltage value of the motor 250 generated by the detection torque applied to the output shaft 251. In addition, the control unit 500 executes the aspiration operation and the discharge operation of the operations of the rod 220 described above based on the value detected by the first pressure detection unit 240. More specifically, in the first pressure detection unit 240, when the position holding control of the motor 250 is also performed in a case where the aspiration operation and the discharge operation described above are performed, and the detection force is transmitted via the rod 220 in a case where the aspiration operation and the discharge operation performed by the rod 220 are performed, the position holding torque is generated to hold a rotational position of the output shaft 251 of the motor 250 at a control position in the aspiration operation and the discharge operation. The first pressure detection unit 240 detects the pressure of the plasticized material in the flow path 66 based on the voltage value for generating the position holding torque. In addition, in the same manner as in the first embodiment to execute the aspiration operation and the discharge operation performed by the aspiration and discharge unit based on the value detected by the first pressure detection unit 240, the control unit 500 executes the aspiration operation and the discharge operation performed by the rod 220 based on the value detected by the first pressure detection unit 240. As illustrated in FIGS. 10 and 11, the forward or backward movement of the rod 220 changes the angle θ between the transmission direction Df of the detection force and the rotation direction Dr of the torque member 260, and the first pressure detection unit 240 can detect the pressure P by Formula (1) described in the first embodiment.

In the present embodiment, since the receiving unit 270 is implemented by the cam follower, the receiving unit 270 can smoothly move in the groove portion 237 along the Y direction in a state of being in contact with the first wall portion 238 or the second wall portion 239. Therefore, the receiving unit 270 can efficiently transmit the detection force from the first wall portion 238, and can efficiently transmit the force due to the rotation of the motor 250 to the first wall portion 238 or the second wall portion 239.

According to the three-dimensional shaping device 100c of the present embodiment described above, even if the heat source is provided near the portion where the pressure is to be measured, or if the provided space near the portion is limited, there is a high possibility that the pressure can be measured in that portion. In particular, in the present embodiment, based on the pressure detected by the first pressure detection unit 240, the control unit 500 executes an operation of causing the rod 220 to retract with respect to the flow path 66 to aspirate the plasticized material in the flow path 66 into the cylinder 210, and an operation of advancing the rod 220 with respect to the flow path 66 to push the aspirated plasticized material toward the nozzle opening 62. According to such an aspect, by operating the rod 220 in the cylinder 210 based on the value detected by the first pressure detection unit 240, aspiration and pushing of the plasticized material based on the detected value can be executed without providing a member, different from the cylinder 210 and the rod 220, for aspirating and pushing the plasticized material. Therefore, a space in the three-dimensional shaping device 100c can be saved, and the responsiveness of stopping or starting the delivery of the plasticized material from the nozzle opening 62 can be enhanced.

D. Fourth Embodiment

Figure 12:
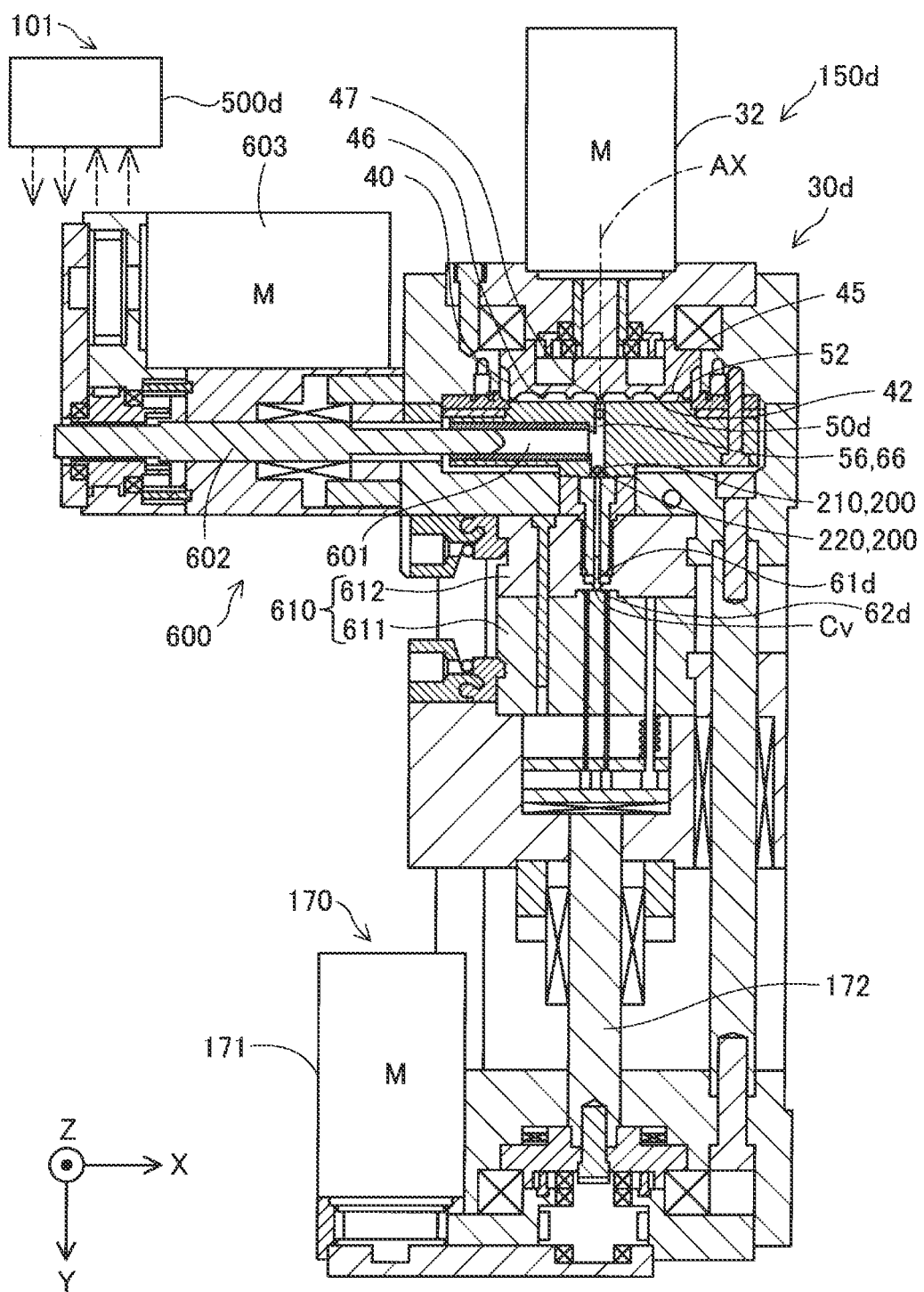
FIG. 12 is a diagram illustrating a schematic configuration of an injection molding device of a fourth embodiment.

FIG. 12 is a diagram illustrating a schematic configuration of an injection molding device 101 of a fourth embodiment. The injection molding device 101 includes a material delivery device 150d, an injection control unit 600, a molding mold 610, a mold clamping device 170, and a control unit 500d. The material delivery device 150d includes a plasticization unit 30d, a nozzle 61d, and the pressure detection unit 200. Unless otherwise specified, configurations of the material delivery device 150d, the pressure detection unit 200, and the control unit 500d in the present embodiment are the same as the configurations in the first embodiment.

The communication hole 56 formed in a barrel 50d of the plasticization unit 30d in the present embodiment forms the entire flow path 66. An injection cylinder 601 of the injection control unit 600 is coupled to the communication hole 56.

The nozzle 61d in the present embodiment delivers the plasticized material produced by the plasticization unit 30d from a nozzle opening 62d to the molding mold 610. More specifically, the nozzle 61d ejects the plasticized material into a cavity Cv of the molding mold 610, which will be described later.

The molding mold 610 includes a movable mold 611 and a fixed mold 612 facing each other, and the cavity Cv between these two molds. The cavity Cv is a space corresponding to a shape of a molded product. In the present embodiment, the movable mold 611 and the fixed mold 612 are formed of a metal material. In another embodiment, the movable mold 611 and the fixed mold 612 may be formed of a ceramic material or a resin material.

The mold clamping device 170 includes a mold drive unit 171 and a ball screw unit 172. The mold drive unit 171 is implemented by a motor, a gear, or the like, and is coupled to the movable mold 611 via the ball screw unit 172. Drive of the mold drive unit 171 is controlled by the control unit 500. The ball screw unit 172 transmits power generated by the drive of the mold drive unit 171 to the movable mold 611. Under the control of the control unit 500, the mold clamping device 170 moves the movable mold 611 by using the mold drive unit 171 and the ball screw unit 172 so as to open and close the molding mold 610.

The injection control unit 600 includes the injection cylinder 601, an injection plunger 602, and a third drive unit 603. The injection cylinder 601 is coupled to the communication hole 56. The injection plunger 602 is inserted into the injection cylinder 601. The injection plunger 602 is driven by the third drive unit 603 and slides in the injection cylinder 601. The third drive unit 603 is implemented by, for example, a stepping motor, a rack and pinion mechanism, or the like, similarly to the second drive unit 76 described in the first embodiment.

The injection control unit 600 executes a weighing operation and an injection operation by causing the injection plunger 602 to slide in the injection cylinder 601 under the control of the control unit 500. The weighing operation, similar to the aspiration operation performed by the aspiration and discharge unit 75 described in the first embodiment, refers to an operation of retracting the injection plunger 602 in a direction away from the flow path 66 to guide the plasticized material in the flow path into the injection cylinder 601, and weighing the plasticized material in the injection cylinder 601. The injection operation, similar to the discharge operation performed by the aspiration and discharge unit 75 described in the first embodiment, refers to an operation of advancing the injection plunger 602 in a direction approaching the flow path 66 to inject the plasticized material in the injection cylinder 601 into the molding mold 610 via the nozzle 61*d*.

The cylinder 210 of the pressure detection unit 200 is coupled to the flow path 66 as in the first embodiment. More specifically, in the present embodiment, the cylinder 210 is coupled to the communication hole 56 downstream of the injection cylinder 601 of the injection control unit 600. In another embodiment, the cylinder 210 may be, for example, coupled in the flow path 66 upstream of the injection cylinder 601. In the present embodiment, the cylinder 210 and the rod 220 are disposed along the Z direction, and the cylinder 210 is coupled to the flow path 66 from a +Z direction of the flow path 66. A pressure detection unit (not illustrated) having the same configuration as the first pressure detection unit 240 illustrated in FIG. 1 is disposed in +Z directions of the cylinder 210 and the rod 220. FIG. 12 illustrates positions of the cylinder 210 and rod 220 in the X and Y directions.

Also in the present embodiment, the control unit 500 can, for example, control the drive of the injection control unit 600 based on the pressure detected by the first pressure detection unit of the pressure detection unit 200. For example, when the weighing operation is performed, the control unit 500 adjusts a retreat speed of the injection plunger 602 according to the pressure of the plasticized material in the communication hole 56, and thus the excess plasticized material can be prevented from being drawn into the injection cylinder 601 and air can be prevented from being mixed into the plasticized material in the injection cylinder 601. In addition, for example, when the injection operation is performed, the control unit 500 adjusts a speed at which the injection plunger 602 is advanced according to the pressure of the plasticized material in the communication hole 56, and thus an insufficient injection amount of the plasticized material injected into the molding mold 610 and generation of a residual stress due to the plasticized material injected into the molding mold 610 with an excessive pressure can be prevented. Further, the control unit 500 may adjust, for example, a rotation speed of the drive motor 32 of the plasticization unit 30*d* according to the pressure detected by the first pressure detection unit, and may adjust a speed, a time, or the like for driving the mold clamping device 170.

According to the injection molding device 101 of the present embodiment described above, even if the heat source is provided near a portion where the pressure is to be measured, or if the provided space near the portion is limited, there is a high possibility that the pressure can be measured in that portion.

In another embodiment, the injection molding device 101 may include, for example, another pressure detection unit configured upstream of the pressure detection unit 200 in the flow path 66, in the same manner as the second pressure detection unit 298 described in the second embodiment. For example, the injection molding device 101 may not be provided with the injection control unit 600, and the pressure detection unit 200 may function as the injection control unit 600. In this case, similar to the case where the pressure detection unit 200*c* exerts the same function as the aspiration and discharge unit 75 in the third embodiment, based on the value detected by the first pressure detection unit, the control unit 500*d* executes an operation of retracting the rod 220 to aspirate the plasticized material into the cylinder 210, and an operation of advancing the rod 220 to push the aspirated plasticized material toward the nozzle opening 62. According to such an aspect, similar to the third embodiment, by operating the rod 220 in the cylinder 210 based on the value detected by the first pressure detection unit, aspiration and pushing of the plasticized material based on the detected value can be executed without providing a member, different from the cylinder 210 and the rod 220, for aspirating and pushing the plasticized material. Therefore, a space in the injection molding device 101 can be saved.

E. Another Embodiment (E-1) In the above embodiments, the transmission unit 222 is the end surface at the opposite side of the rod end surface 221 in the longitudinal direction of the rod 220. Meanwhile, the transmission unit 222 may not be the end surface at the opposite side of the rod end surface 221 in the longitudinal direction of the rod 220. For example, the transmission unit 222 may be a side surface of a portion between both end surfaces in the longitudinal direction of the rod 220, or may be an uneven surface provided on the side surface of the portion between both end surfaces in the longitudinal direction of the rod 220.

(E-2) In the above embodiments, the pressure detection unit 200 includes the force applying member 230. Meanwhile, the pressure detection unit 200 may not include the force applying member 230. For example, the transmission unit 222 of the rod 220 may directly transmit the force due to the pressure of the plasticized material in the flow path 66 to the first pressure detection unit 240.

(E-3) In the above embodiments, when the first pressure detection unit 240 detects the pressure of the plasticized material, the position holding control of the motor 250 is performed. Meanwhile, when the first pressure detection unit 240 detects the pressure of the plasticized material, the position holding control of the motor 250 may not be performed. In this case, the first pressure detection unit 240 may detect the pressure of the plasticized material in the flow path 66, for example, based on a current value and a voltage value of a regenerative power generated in the motor 250 when the detection torque is applied to the output shaft 251.

(E-4) In the above embodiments, the first pressure detection unit 240 includes the motor 250. Meanwhile, the first pressure detection unit 240 may not include the motor 250. For example, the first pressure detection unit 240 may be implemented by a piezoelectric type pressure sensor or a diaphragm type pressure sensor.

(E-5) In the above embodiments, the receiving unit 270 is implemented by a cam follower or a roller follower. Meanwhile, the receiving unit 270 may not be implemented by the cam follower or may not be implemented by the roller follower.

(E-6) In the above embodiments, the plasticization unit 30 of the material delivery device 150 plasticizes a material with a flat screw to produce a plasticized material. Meanwhile, the plasticization unit 30 may plasticize the material by rotating an in-line screw to produce a plasticized material, for example. In the three-dimensional shaping device 100, the material delivery device 150 may be configured to plasticize a filamentary material and deliver a plasticized material from the nozzle opening 62.

(E-7) In the above embodiments, the set temperature of the nozzle heater 68 is higher than the set temperature of the plasticizing heater 58. Meanwhile, the set temperature of the nozzle heater 68 may be equal to or lower than the set temperature of the plasticizing heater 58. For example, the nozzle heater 68 may not be provided.

(E-8) In the above embodiments, the delivery amount adjustment unit 70 is disposed, in the flow path 66, upstream of the coupling portion between the flow path 66 and the cylinder 210. Meanwhile, the delivery amount adjustment unit 70 may be disposed downstream of the coupling portion between the flow path 66 and the cylinder 210, for example. In addition, the delivery amount adjustment unit 70 may not be provided.

(E-9) In the above embodiments, the aspiration and discharge unit 75 is coupled between the delivery amount adjustment unit 70 and the nozzle opening 62 in the flow path 66. Meanwhile, the aspiration and discharge unit 75 may be disposed upstream of the delivery amount adjustment unit 70 in the flow path 66, for example.

F. Another Aspects

The present disclosure is not limited to the embodiments described above, and can be implemented in various aspects without departing from the scope of the present disclosure. For example, the present disclosure can be implemented in the following aspects. In order to solve a part of or all of problems of the present disclosure, or to achieve a part of or all of effects of the present disclosure, technical features in the above-described embodiments corresponding to technical features in the following aspects can be replaced or combined as appropriate. Unless described as essential in the present specification, the technical features can be deleted as appropriate.

(1) According to a first aspect of the present disclosure, a material delivery device is provided. The material delivery device includes: a plasticization unit having a screw and configured to plasticize a material by rotation of the screw to produce a plasticized material; a flow path through which the plasticized material flows; a nozzle having a nozzle opening that communicates with the flow path and delivers the plasticized material to an outside; a cylinder coupled to the flow path; a rod inserted into the cylinder; and a first pressure detection unit configured to detect a pressure of the plasticized material in the flow path via the rod. In a longitudinal direction of the rod, the rod has a rod end surface facing the flow path and a transmission unit farther from the flow path than the rod end surface, and transmits a force due to the pressure received at the rod end surface to the first pressure detection unit via the transmission unit.

According to such an aspect, the first pressure detection unit can indirectly measure the pressure of the plasticized material in the flow path via the rod. Therefore, even if a heat source is provided near a portion where the pressure is to be measured, or if the provided space near the portion is limited, there is a high possibility that the pressure can be detected in that portion.

(2) In the material delivery device of the above aspect, the first pressure detection unit includes a motor having an output shaft and a torque member that is coupled to the output shaft and receives the force transmitted via the transmission unit, the torque member applies a torque due to the received force to the output shaft, and the first pressure detection unit may detect the pressure based on a current value or a voltage value of the motor generated by the torque. According to such an aspect, the pressure of the plasticized material in the flow path can be detected by using the motor. Therefore, for example, as compared with a case where the first pressure detection unit is implemented by a sensor that measures the pressure by a piezoelectric effect, a heat resistance of the first pressure detection unit can be easily improved.

(3) In the material delivery device of the above aspect, the torque member may include a receiving unit that receives the force transmitted via the transmission unit at a position deviated from a rotation shaft of the output shaft when viewed along the output shaft. According to such an aspect, the torque member can easily apply the torque to the output shaft by receiving the force by the receiving unit. By adjusting a distance of the receiving unit from the rotation shaft, a width and a resolution of the pressure value that can be detected can be easily adjusted.

(4) In the material delivery device of the above aspect, the receiving unit is implemented by a cam follower or a roller follower. According to such an aspect, the detection force is transmitted to the receiving unit more efficiently. Therefore, wear or breakage of the receiving unit when the detection force is transmitted to the receiving unit is prevented.

(5) In the material delivery device of the above aspect, the screw has a groove forming surface on which a groove is formed, the plasticization unit may further include a barrel that has a facing surface facing the groove forming surface, and in the facing surface, is formed with a communication hole forming at least a part of the flow path, and a plasticizing heater that heats the material supplied between the screw and the barrel. According to such an aspect, the plasticization unit can be miniaturized, and thus the entire material delivery device can be miniaturized.

(6) In the material delivery device of the above aspect, a nozzle heater that heats the nozzle is provided, and a set temperature of the nozzle heater is set higher than a set temperature of the plasticizing heater. According to such an aspect, the nozzle heater can further enhance fluidity of the plasticized material in the nozzle, and the plasticized material can be efficiently delivered from the nozzle opening to the outside. In addition, when a temperature of the flow path or the like in the vicinity of the nozzle is increased by the nozzle heater, the pressure of the plasticized material in the flow path or the like in the vicinity of the nozzle can be easily detected by the first pressure detection unit via the rod 220.

(7) According to a second aspect of the present disclosure, a three-dimensional shaping device is provided. The three-dimensional shaping device includes: the material delivery device in the above aspect; a stage configured to deposit the plasticized material delivered from the nozzle; a control unit configured to control the material delivery device; and a delivery amount adjustment unit disposed, in the flow path, upstream of a coupling portion between the flow path and the cylinder and configured to adjust a flow rate of the plasticized material delivered from the nozzle opening. According to such an aspect, the first pressure detection unit can accurately detect a pressure of the plasticized material downstream of the delivery amount adjustment unit in the flow path. In particular, also when a flow rate of the plasticized material downstream of the delivery amount adjustment unit in the flow path is adjusted to be smaller by the delivery amount adjustment unit, the pressure of the plasticized material downstream of the delivery amount adjustment unit can be detected accurately. Therefore, the mechanism or the like disposed downstream of the delivery amount adjustment unit in the flow path can be controlled more accurately based on the pressure detected by the first pressure detection unit.

(8) The three-dimensional shaping device of the above aspect includes a second pressure detection unit configured to detect a pressure of the plasticized material upstream of the delivery amount adjustment unit in the flow path, and the control unit controls the rotation of the screw based on a value detected by the second pressure detection unit. According to such an aspect, the control unit can adjust an amount of the plasticized material produced by the plasticization unit based on the pressure of the plasticized material upstream of the delivery amount adjustment unit. Accordingly, in the flow path, a flow rate of the plasticized material upstream of the delivery amount adjustment unit can be adjusted more accurately, and thus the flow rate of the plasticized material in the entire flow path can be easily adjusted. Therefore, there is a high possibility that the delivery amount of the plasticized material delivered from the nozzle opening can be adjusted more accurately.

(9) The three-dimensional shaping device of the above aspect includes an aspiration and discharge unit coupled between the delivery amount adjustment unit and the nozzle opening in the flow path, and configured to aspirate the plasticized material in the flow path and push the aspirated plasticized material toward the nozzle opening, in which the control unit may control the aspiration and discharge unit based on a value detected by the first pressure detection unit. According to such an aspect, both the cylinder and the aspiration and discharge unit are coupled between the delivery amount adjustment unit and the nozzle opening in the flow path, and thus the aspiration and discharge unit can be controlled more accurately based on the pressure detected by the first pressure detection unit via the rod inserted into the cylinder. Therefore, the responsiveness of starting or stopping the delivery of the plasticized material from the nozzle opening can be further enhanced.

(10) In the three-dimensional shaping device of the above aspect, based on the value detected by the first pressure detection unit, the control unit may execute an operation of retracting the rod with respect to the flow path to aspirate the plasticized material in the flow path into the cylinder, and an operation of advancing the rod with respect to the flow path to push the aspirated plasticized material toward the nozzle opening. According to such an aspect, by operating the rod in the cylinder based on the value detected by the first pressure detection unit, aspiration and pushing of the plasticized material based on the detected value can be executed without providing a member, different from the cylinder and the rod, for aspirating and pushing the plasticized material. Therefore, a space in the three-dimensional shaping device can be saved, and the responsiveness of stopping or starting the delivery of the plasticized material from the nozzle opening can be enhanced.

(11) According to a third aspect of the present disclosure, an injection molding device is provided. The injection molding device includes the material delivery device in the above aspect, and a control unit configured to control the material delivery device, in which the nozzle delivers the plasticized material to a molding mold.

(12) In the injection molding device of the above aspect, based on the value detected by the first pressure detection unit, the control unit may execute an operation of retracting the rod with respect to the flow path to aspirate the plasticized material in the flow path into the cylinder, and an operation of advancing the rod with respect to the flow path to push the aspirated plasticized material toward the nozzle opening. According to such an aspect, by operating the rod in the cylinder based on the value detected by the first pressure detection unit, aspiration and pushing of the plasticized material can be executed without providing a member for aspirating and pushing the plasticized material, different from the cylinder and the rod. Therefore, a space in the injection molding device can be saved.

What is claimed is:

1. A material delivery device, comprising:
    a plasticization unit including a screw and configured to plasticize a material by rotation of the screw to produce a plasticized material;
    a flow path through which the plasticized material flows;
    a nozzle having a nozzle opening that communicates with the flow path and delivers the plasticized material to an outside;
    an aspirator and discharger coupled between the screw and the nozzle opening in the flow path, and configured to aspirate the plasticized material in the flow path and push the aspirated plasticized material towards the nozzle opening,
    a cylinder coupled to the flow path between the aspirator and discharger and the nozzle opening;
    a rod inserted into the cylinder; and
    a first pressure detector detection unit configured to detect a pressure of the plasticized material in the flow path via the rod, wherein
    in a first direction which is a longitudinal direction of the rod, the rod has a rod end surface facing the flow path and a transmitter farther from the flow path than the rod end surface, and transmits a force due to the pressure received at the rod end surface to the first pressure detector via the transmitter.

2. The material delivery device according to claim 1, wherein the first pressure detector includes a motor having an output shaft and a torque member that is coupled to the output shaft and receives the force transmitted via the transmitter,
    the torque member applies a torque due to the received force to the output shaft, and
    the first pressure detector detects the pressure based on a current value or a voltage value of the motor generated by the torque.

3. The material delivery device according to claim 2, wherein the torque member includes a receiver that receives the force transmitted via the transmitter at a position deviated from the rotation shaft of the output shaft when viewed along the output shaft.

4. The material delivery device according to claim 3, wherein the receiver is implemented by a cam follower or a roller follower.

5. The material delivery device according to claim 1, wherein
    the screw has a groove forming surface on which a groove is formed, and the plasticization unit further includes:
    a barrel that has a facing surface facing the groove forming surface, and in the facing surface, is formed with a communication hole forming at least a part of the flow path; and
    a plasticizing heater configured to heat the material supplied between the screw and the barrel.

6. The material delivery device according to claim 5, further comprising: a nozzle heater configured to heat the nozzle, wherein a set temperature of the nozzle heater is set higher than a set temperature of the plasticizing heater.

7. A three-dimensional shaping device, comprising:
    the material delivery device according to claim 1;
    a stage configured to deposit the plasticized material delivered from the nozzle;

a control unit configured to control the material delivery device; and a delivery amount adjuster disposed, in the flow path, upstream of a coupling portion between the flow path and the cylinder and configured to adjust a flow rate of the plasticized material delivered from the nozzle opening.

8. The three-dimensional shaping device according to claim 7, further comprising:

a second pressure detector configured to detect a pressure of the plasticized material upstream of the delivery amount adjuster in the flow path, wherein the control unit controls rotation of the screw based on a value detected by the second pressure detector.

9. The three-dimensional shaping device according to claim 7, wherein the aspirator and discharger is coupled between the delivery amount adjuster and the nozzle opening in the flow path, and the control unit controls the aspirator and discharger based on a value detected by the first pressure detector.

10. The three-dimensional shaping device according to claim 7, wherein based on a value detected by the first pressure detector, the control unit executes an operation of retracting the rod with respect to the flow path to aspirate the plasticized material in the flow path into the cylinder, and an operation of advancing the rod with respect to the flow path to push the aspirated plasticized material toward the nozzle opening.

11. An injection molding device, comprising: the material delivery device according to claim 1; and a control unit configured to control the material delivery device, wherein the nozzle delivers the plasticized material to a molding mold.

12. The injection molding device according to claim 11, wherein based on a value detected by the first pressure detector, the control unit executes an operation of retracting the rod with respect to the flow path to aspirate the plasticized material in the flow path into the cylinder, and an operation of advancing the rod with respect to the flow path to push the aspirated plasticized material toward the nozzle opening.

13. The material delivery device according to claim 1, further comprising a force applying member being provided between the rod and the first pressure detector in the first direction, the force applying member having an axial shape with a longitudinal direction of the force applying member as the first direction and the force applying member transmitting the force due to the pressure received at the rod end surface to the first pressure detector.

14. The material delivery device according to claim 13, wherein a recess is formed at an end surface of the force applying member on a rod side, a tip of the rod on the force applying member side is inserted into the recess, and a gap is formed between a side surface of the tip of the rod on the force applying member side and an inner surface of the recess.

15. The material delivery device according to claim 1, wherein the aspirator and discharger have a plunger, and the material delivery device further comprising a control unit configured to control the aspirator and discharger to perform an aspiration operation to move the plunger away from the flow path and a discharge operation to move the plunger closer to the flow path, and the control unit adjusts an operation timing of the plunger, an operation speed of the plunger, a backward distance of the plunger, or a forward distance of the plunger, in the aspiration operation or the discharge operation, based on a pressure value detected by the first pressure detector.

16. A three-dimensional shaping device, comprising:
the material delivery device according to claim 1;
a stage configured to deposit the plasticized material delivered from the nozzle; and
a delivery amount adjuster disposed, in the flow path, downstream of a coupling portion between the flow path and the cylinder and configured to adjust a flow rate of the plasticized material delivered from the nozzle opening.

* * * * *